July 9, 1963    R. A. PRICE ET AL    3,096,854
BRAKE SYSTEM FOR RAIL VEHICLES
Filed Sept. 25, 1961    3 Sheets-Sheet 1
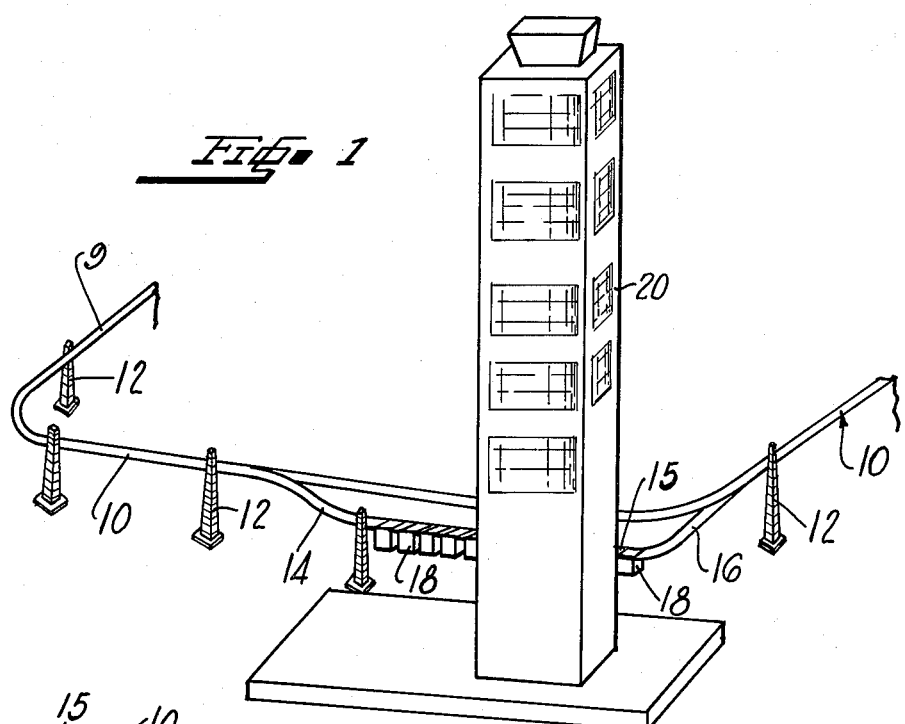
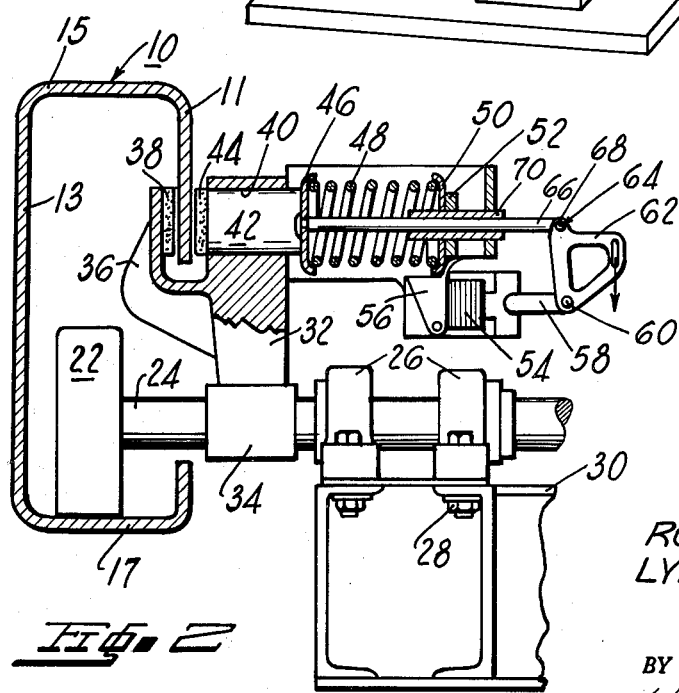
ROBERT A. PRICE
LYLE E. MASSING
INVENTORS
BY
*William G. Thompson*
AGENT

ROBERT A. PRICE
LYLE E. MASSING
INVENTORS

BY
AGENT

July 9, 1963 R. A. PRICE ET AL 3,096,854
BRAKE SYSTEM FOR RAIL VEHICLES
Filed Sept. 25, 1961 3 Sheets-Sheet 3

ROBERT A. PRICE
LYLE E. MASSING
INVENTORS

BY
William J. Thompson
AGENT

United States Patent Office 3,096,854
Patented July 9, 1963

3,096,854
BRAKE SYSTEM FOR RAIL VEHICLES
Robert A. Price and Lyle E. Massing, South Bend, Ind., assignors to The Bendix Corporation, a corporation of Delaware
Filed Sept. 25, 1961, Ser. No. 140,404
8 Claims. (Cl. 188—42)

The present invention relates to a brake system for rail vehicles more particularly of the rail suspended type having braking means for normal braking, emergency braking, and rail downgrade braking purposes and being further arranged to include a fail safe and emergency mode of operation suitable for passenger carrying vehicles.

It is an object of the present invention to provide a brake system for rail vehicles having optimum qualities of simple construction, ease of maintenance, interchangeability and safety.

It is another object of the present invention to provide a brake system for rail vehicles utilizing a mechanical spring force for the brake application force and electric solenoid means for releasing the brake to provide a fail safe mode of operation.

It is a further object of the present invention to provide a brake system of the mechanically spring actuated solenoid release type including a manual override release mechanism for releasing the brakes in event of solenoid or electrical system failure.

It is a still further object of the invention to provide a brake system for rail suspended vehicles for use with a rail plan having upgrade and downgrade portions, said brake system including downgrade acceleration braking means in addition to normal braking means to compensate for gravity acceleration effects.

The foregoing and other objects will appear and become apparent from the following detailed description of a preferred embodiment of the invention, particularly when considered in connection with the accompanying drawings, in which:

FIGURE 1 is a schematic view of a typical rail vehicle system including rail downgrade and upgrade portions;

FIGURE 2 is a side schematic view partly in section of a normal brake device and rail section of the present invention to illustrate the functional operation thereof;

Figure 3:
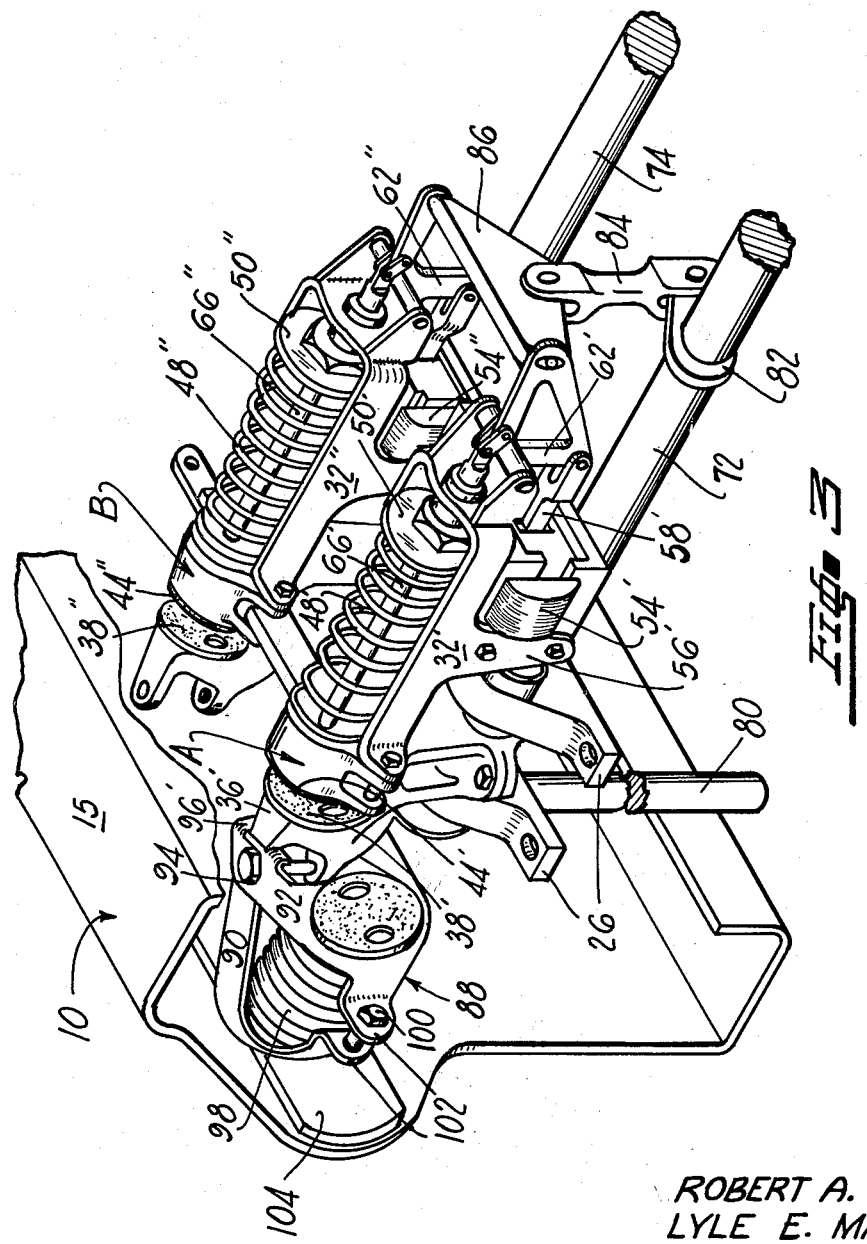
FIGURE 3 is an isometric view of a first embodiment of the present invention including a grade brake of the compression type.

Referring now to FIGURE 1 in particular, there is shown a partial suspended rail vehicle layout in schematic form including a pair of suspended rails 10 mounted on supports 12 at sufficient height to provide clearance for ground traffic or other desired purposes. The rail system comprises a main line section 9, a rail downgrade section at 14, a low level portion 15, and an upgrade portion at 16 to permit the vehicles 18 to be brought sufficiently proximate the ground level at loading terminal 20 to permit convenient passenger loading and unloading.

It is the broad purpose of the present invention to provide a suitable brake system for the vehicle system of FIGURE 1 which has been illustrated as a double rail suspended vehicle system. It should be understood that to the extent the prior art and utility of function permit, it is also anticipated that some of the features of the present invention may be conveniently utilized in ground rail and single rail systems as will be apparent as the description proceeds.

Referring to FIGURE 2 there is illustrated in schematic form the normal braking portion of a rail brake of the present invention to particularly disclose the functional operation thereof. The figure includes a cross sectional view of a vehicle supporting rail 10 of the channel beam or C section type. A vehicle wheel 22 is mounted for rotation on axle 24 and bears against the bottom side of channel beam 10 on lower flange 17. A pair of brackets 26 are secured by bolts 28 or the like to truck or vehicle frame 30 of vehicle 18 and support the axle 24 which in the FIGURE 2 arrangement doubles as a brake support rod. A brake carrier or housing 32 is movably mounted on axle 24 or other fixed support means by integral collar or clamp 34 which loosely engages axle 24 to permit free movement of the carrier in the direction of the longitudinal axis of axle 24 or normal to rail 10. Carrier 32 includes a member 36 projecting into the opening of channel rail 10 and has a friction lining surface 38 bonded or otherwise fixed thereto and held in close proximity to the interior side of the upper or brake engaging web 11 of rail 10. Rail 10 is further comprised of a back web 13 and upper and lower end flanges 15 and 17 respectively. Carrier 32 further includes a bore or opening 40 arranged exteriorly to rail 10 in alignment with friction lining 38 and proximate brake engaging web 11. A cylindrical ram or actuating member 42 is movably mounted in bore 40 and includes a friction lining member 44 fixed at the left end thereof. A spring retainer 46 is secured to the right end of ram 42 and absorbs the force produced by compression spring 48 which is confined on its other end by retainer 50. Retainer 50 is in turn supported by an abutment 52 which extends from the brake carrier or housing 32. The force generated by spring 48 urges ram 42 and lining 44 into frictional engagement with web 11 whereas the reaction force on retainer 50, abutment 52, and carrier 32 draws the friction lining 38 into engagement with the interior side of said web. Thus the brake system this far described is a normally actuated mechanical brake which is self-aligning with respect to the braking web 11 of rail 10.

An electric solenoid 54 is supported by a bracket 56 extending from carrier 32 and includes a movable electrically actuated rod or lever member 58 which is pivotably secured by pin 60 to trapezoidal shaped bell crank member 62. Bell crank 62 is supported on pivot 64 which is adapted to be secured to carrier 32, however, in this view support arms for pin 68 are not illustrated so as not to obscure the remaining parts. A movable rod 66 is secured on the left end to retainer 46 and/or ram 42 and is pivotably secured by pin 68 to the upper end of bell crank 62. Thus to effect brake release solenoid 54 may be actuated by applying a suitable source of electric power, which draws lever 58 to the left rotating bell crank 62 clockwise which in turn moves pivot pin 68 and rod 66 a small increment to the right. Rod 66 may be axially aligned and supported by means such as collar 70 fixedly mounted on carrier 32. Pin connections should be sufficiently loose or slotted, to permit angular movement of bell crank 62 relative to rods 66 on 58. As rod 66 is drawn to the right, spring 48 is compressed moving ram 42 to the right with respect to carrier 32 and thus releasing the brake unit.

Referring now to FIGURE 3 there is shown a preferred embodiment of a brake system of the present invention. It is proposed that in double rail systems two units such as illustrated in FIGURE 3 will be used one at each side of the vehicle for uniform braking.

In the embodiment illustrated, a pair of normally actuated electrically released self-aligning caliper brake units A and B each individually functioning in the manner previously disclosed are arranged side by side and each separately mounted on brake support rods 72 and 74, respectively, the support rod 74 may be the wheel axle if desired. The individual parts of the brake units A and B are numbered to correspond to the numerals shown in FIGURE 2 with the addition of prime and double prime marks respectively.

It is desired to supply two brake units A and B in the preferred form of our invention, either of which may be separately actuated for normal braking and both of which are preferably simultaneously actuated when emergency deceleration is required or when the vehicle is at rest to insure fixed positive vehicle location during loading and unloading operations. It is further desirable to alternate the use of brake units A and B for normal braking to evenly distribute lining wear.

Manual means for releasing brake units A and B comprising a lever 80 and bell crank 82 secured to support rod 72, a link 84 and yoke 86 interconnecting bell crank 82 and the pair of trapezoidal bell cranks 62' and 62" of the brake units. In event electrical power failure should occur while the vehicle 18 is on the main line portion of rail 10, the brakes would become actuated. As an emergency measure, lever 80 may be rotated turning rod 72 and bell crank 82 to move bell cranks 62' and 62" downwardly and release the brakes to permit emergency positioning of the vehicle. Yoke 86 loosely engages bell cranks 62' and 62" to permit release of either or both brake units depending on which units are applied.

A grade brake is generally indicated at 88 and is comprised of a pair of relatively movable brake members 90 and 92 and a compression spring member 98 interposed between said members. Bolt 94 provides a common support pivot for members 90 and 92 securing said members to lugs 96' formed on projection 36' of brake carrier 32'. A bolt 100 is loosely fitted through holes provided in projections 102 of members 90 and 92 to permit limited outward expansion thereof. In downgrade portions of rail 10 the internal running clearance between back web 13 and brake engaging web 11 is decreased such as for example by securing a strap metal section 104 to one of said webs. Other means for decreasing running clearance may be utilized, if desired such as for example by indenting one of said webs.

In main line and upgrade portions of rail 10 limit bolts 100 prevent frictional engagement of members 90 and 92 with webs 11 and 13 by limiting the degree of expansion. As the vehicle descends on a downgrade rail portion, gravitational pull tends to accelerate the vehicle. By design the width of strap 104 and preload of spring 98 may be controlled to provide a degree of braking to offset gravitational acceleration and maintain a substantially uniform vehicle speed.

Figure 4:
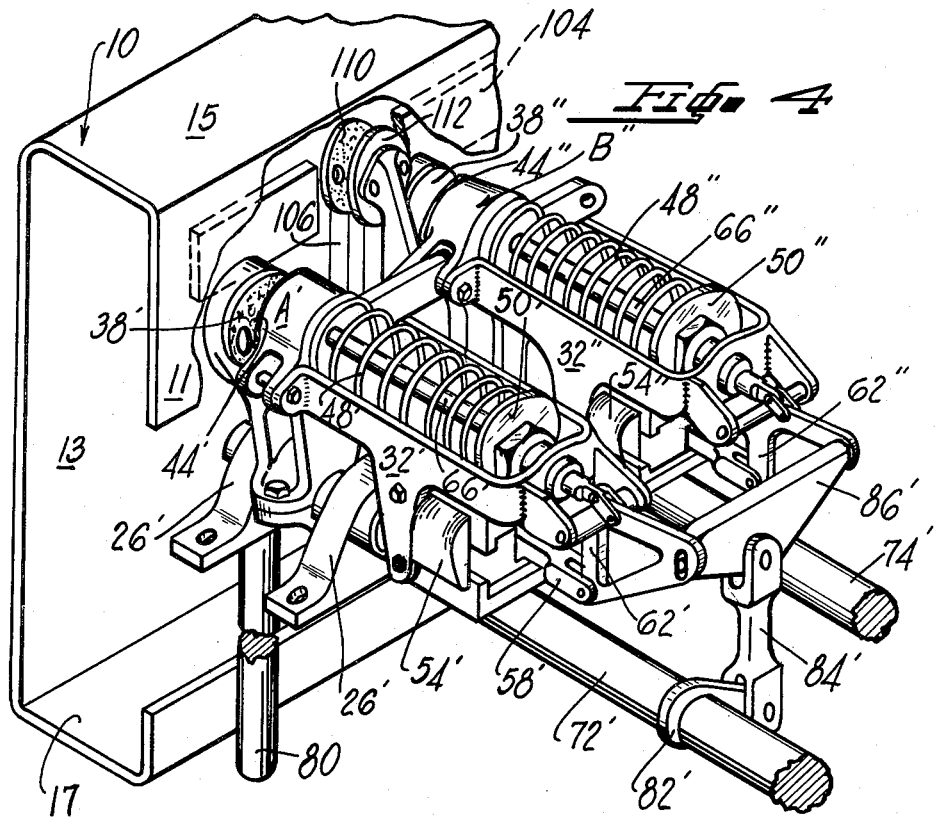
FIGURE 4 is another isometric view of a second embodiment of the present invention including a grade brake of the caliper or clamp type.
Figure 5:
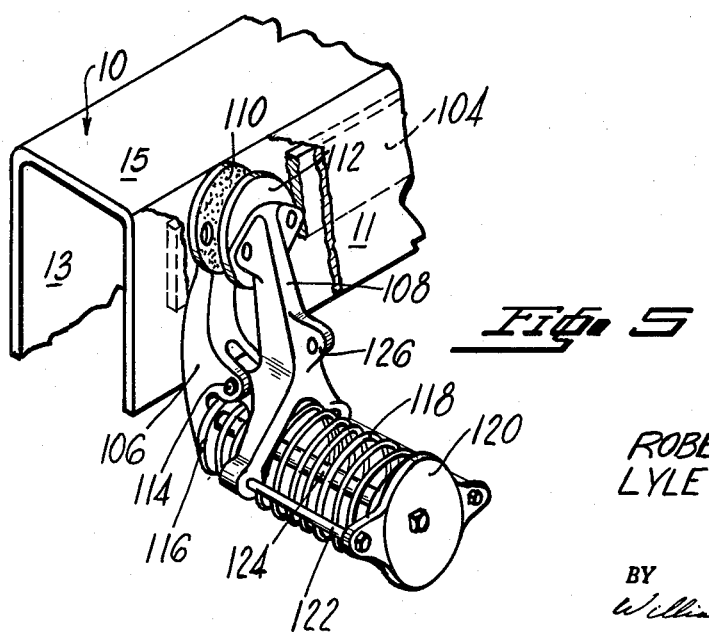
FIGURE 5 is an isometric view of the caliper or clamp grade brake of the FIGURE 4 embodiment.

Referring now to FIGURES 4 and 5 there is shown a brake system including a modified grade brake of the caliper type comprised of two relatively movable brake members 106 and 108 containing friction members 110 and 112 respectively. Members 106 and 108 are connected at pivot 114 and project around brake engaging web 11 in close proximity to opposed faces of said web. Strap 104 is secured to brake engaging web 11 to provide increased web thickness in rail downgrade portions. Movable member 106 includes an abutment 116 formed at its lower end which bears against one end of compression spring 118. A floating retainer 120 retains spring 118 on its other end and is slidably mounted on a pair of rods 122 interconnecting the lower end of brake member 108 and a central support and limit rod 124 secured to abutment 106. The force produced by spring 118 urges the lower ends of brake members 106 and 108 apart and friction surfaces 110 and 112 in a direction towards brake engaging web 11. Rod 124 limits the travel of floating retainer 120 and thus establishes the minimum running clearance between friction surfaces 110 and 112 which is designed to be greater than the normal thickness of web 11 so that in main-line and upgrade portions of rail 10 the grade brake is not operative. In downgrade portions of rail 10 the increased rail thickness due to strap 104 is greater than the running clearance between friction surfaces 110 and 112 thus causing a braking effect counteracting gravitational acceleration. A securing lug 126 is formed on brake member 108 to provide a means for securing the assembly to one of the brake carriers 32' or 32".

As a result of this invention, a highly efficient and reliable brake system has been provided for both normal and emergency operation of a suspended rail vehicle. It will be apparent that various changes and modifications may be made in the construction and arrangement of the various parts without departing from the scope of this novel concept limited only as defined in the claims below.

We claim:

1. The combination of a brake system and rail suspended vehicle comprising: a vehicle frame, a vehicle supporting rail having a brake engaging web, a rod-like support member secured to said vehicle frame and having a longitudinally extending axis arranged substantially normal to said brake engaging web, a brake carrier member slidably mounted on said rod-like support member and including first and second portions extending adjacent opposed sides of said web, a first friction surface secured to said first portion of said brake carrier proximate one side of said web and movable into and out of frictional engagement therewith with movement of said brake carrier, a movable brake actuating member slidably mounted in said second portion, said brake actuating member including a second friction surface secured thereto arranged proximate the other side of said web in opposed relation to said first friction surface, a spring member confined between said movable brake actuating member on one end and said carrier member on another end to urge said members in opposed directions to normally engage said first and second friction surface with said web, and solenoid means mounted on said carrier operative to compress said spring member and release said friction surfaces from engagement with said web when an actuating electrical signal is applied.

2. The combination of a brake system and rail suspended vehicle comprising: a vehicle frame, a vehicle supporting rail having a continuous brake engaging web, a longitudinally disposed support member secured to said vehicle frame substantially normal to said brake engaging web, a brake carrier slidably mounted on said support member and having portions extending adjacent opposed sides of said web, a first friction surface secured to one of said portions for engagement with said web on movement of said brake carrier, a brake actuating member slidably mounted in the other of said portions and including a second friction surface engageable with said web, a spring member acting on said carrier and said actuating member to urge both said friction surfaces into engagement with said web, a solenoid secured to said carrier, lever means interconnecting said solenoid and said brake actuating member to move said carrier and said actuating members relatively in a brake releasing direction when said solenoid is actuated.

3. The combination of a brake system and rail suspended vehicle comprising: a vehicle frame, a vehicle supporting rail having a brake engaging web, a pair of parallel rod-like support members secured to said vehicle frame substantially normal to said brake engaging web, first and second brake assemblies each slidably mounted on one of said pair of rod-like support members in side by side relation, said brake assemblies each including a carrier member and actuator member having friction surfaces secured thereto and being relatively movable to frictionally engage said web, said brake assemblies further including a spring member for resiliently urging said friction surfaces into engagement with said web and solenoid means for opposing said spring member when actuated and release said friction surfaces from web engagement, a manually positioned lever member connected to said brake assemblies to manually release said friction surfaces in event said solenoid means should fail.

4. The combination in a rail suspended vehicle system comprising: a vehicle supporting rail having a brake engaging web, said web having greater thickness in rail downgrade sections than in level rail sections, a vehicle frame supported by said rail, a rod-like support member secured to said vehicle substantially normal to said brake engaging web, a brake carrier member slidably mounted on said rod-like support member, grade brake means supported by said carrier member operative to frictionally engage said web at said thickened downgrade section, and means limiting movement of said grade brake means to prevent frictional engagement with said level rail sections having thinner web thickness.

5. The combination in a rail suspended vehicle system comprising: a vehicle supporting rail of channel beam construction having a back web, two end flanges, and a brake engaging web partially extending across an open side of said channel beam; one of said webs having a thickened section at rail downgrade sections; a vehicle frame supported by said rail; brake support means secured to said vehicle frame; a brake carrier slidably mounted on said brake support means to permit movement substantially normal to said channel beam webs; a spring loaded brake device frictionally engaging at least one of said channel beam webs at said thickened downgrade sections; and limit means operative with said brake device to prevent frictional engagement at normal unthickened rail sections.

6. The combination in a rail suspended vehicle system comprising: a vehicle supporting rail of channel beam construction having a back web, two end flanges, and a brake engaging web partially extending across an open side of said channel beam; said rail being formed to have less internal running clearance between opposing sides of said webs at rail downgrade sections than in other rail sections, a vehicle frame supported by one of said rail end flanges, brake support means secured to said vehicle frame, a movable brake carrier slidably mounted on said brake support means for movement in a direction substantially normal to said rail webs, a pair of relatively movable brake members secured to said brake carrier and including friction surfaces arranged proximate said webs, a spring contained between said relatively movable brake members urging outward expansion thereof and engagement of said friction surfaces with said webs in rail downgrade sections, stop means operative with said brake members to limit outward expansion thereof and prevent engagement of said friction surfaces with said webs in said other rail sections.

7. The combination in a rail suspended vehicle system comprising: a vehicle supporting rail of channel beam construction having a back web, two end flanges, and a brake engaging web partially extending across an open side of said channel beam; said brake engaging web formed to have greater cross sectional thickness in rail downgrade sections than in other rail sections; a vehicle frame supported by one of said rail end flanges; brake support means secured to said vehicle frame; a movable brake carrier slidably mounted on said brake support means for movement in a direction substantially normal to said rail webs, a pair of relatively movable brake members secured to said brake carrier, said pair of brake members each having a projection with friction surfaces secured thereto extending adjacent opposed sides of said brake engaging web, a spring member interposed between said relatively movable brake members urging said friction surfaces into frictional engagement with said brake engaging web at rail downgrade sections, and stop means limiting movement of said brake members to prevent frictional engagement with said brake engaging web at other rail sections.

8. The combination in a rail suspended vehicle system comprising: a vehicle supporting rail having a brake engaging web, a vehicle frame, a first and second brake support rod member secured to said vehicle frame, first and second brake assemblies mounted on said first and second support rod members respectively, each of said brake assemblies having friction surfaces in clamping engagement with said brake engaging web and spring means operative to normally engage said friction surfaces with said web, first and second solenoids, first and second lever means including bell crank members interconnecting said first and second solenoids and said first and second brake assemblies respectively to release brake assemblies from engagement with said web on actuation of said solenoids, a yoke member interconnecting said bell cranks, and manually positionable means connected to said yoke member to manually release said brake assemblies on actuation thereof.

No references cited.